United States Patent [19]

Cooper et al.

[11] Patent Number: 5,043,998
[45] Date of Patent: Aug. 27, 1991

[54] NARROW-BANDWIDTH UNSTABLE RESONATOR LASER CAVITY

[75] Inventors: David G. Cooper, Riva, Md.; John F. Reintjes, Alexandria, Va.; Lawrence L. Tankersley, Annapolis, Md.; James L. Dexter, Alexandria, Va.

[73] Assignee: United States of America as represented by the Secretary of the Navy, Washington, D.C.

[21] Appl. No.: 598,513

[22] Filed: Oct. 16, 1990

[51] Int. Cl.$^5$ .............................................. H01S 3/08
[52] U.S. Cl. ...................................... 372/95; 372/20; 372/103
[58] Field of Search .................... 378/95, 92, 98, 103, 378/108, 99, 20, 10, 106

[56] References Cited

U.S. PATENT DOCUMENTS

| H99 | 8/1986 | Jones et al. | 372/108 |
|---|---|---|---|
| 4,354,271 | 10/1982 | Hon | 372/19 |
| 4,520,484 | 5/1985 | Huignard et al. | 372/24 |
| 4,802,176 | 1/1989 | O'Meara | 372/20 |
| 4,868,515 | 9/1989 | Reintjes et al. | 372/95 |

Primary Examiner—Leon Scott, Jr.
Attorney, Agent, or Firm—Thomas E. McDonnell; George Jameson

[57] ABSTRACT

An unstable resonator laser cavity providing high power radiation with diffraction-limited divergence and narrow-bandwidth comprises a gain medium for generating and amplifying laser radiation optically coupled to a reflector via a frequency narrowing element for providing feedback and bandwidth-narrowing of the laser radiation travelling between the gain medium and the reflector. A telescopic ring is optically coupled to the gain medium opposing the reflector. The telescopic ring comprises a polarized beam splitter, which transmits a first polarization polarized laser radiation into the telescopic ring travelling in a first direction and reflects a second polarization polarized laser radiation into the telescopic ring travelling in a second direction; first and second rotators for rotating the first polarization polarized laser radiation to provide second polarization polarized laser radiation travelling in the first direction; and lenses for magnifying the second polarization polarized laser radiation travelling in the first direction onto the polarized beam splitter, which reflects the second polarization polarized laser radiation produced by the first and second rotators back into the gain medium. A scraper mirror, located between the gain medium and the reflector, provides the output beam.

19 Claims, 4 Drawing Sheets

NARROW-BANDWIDTH UNSTABLE RESONATOR LASER CAVITY

FIELD OF THE INVENTION

The present invention relates generally to a laser source, and, more specifically, to an unstable resonator laser cavity providing high power laser radiation with diffraction-limited divergence and narrow-bandwidth.

BACKGROUND OF THE INVENTION

Various methods and apparatus are known for producing laser radiation which is characterized by: a) high power; b) diffraction-limited divergence; and c) narrow bandwidth. Methods and apparatus which provide all three characteristics simultaneously are usually costly and complicated, and often require multiple laser sources.

Stable laser cavities, for example, are used to provide radiation having low spatial divergence and narrow bandwidth. Low spatial divergence is obtained by restricting the laser aperture to operate in the lowest transverse mode of the stable cavity. For near infrared or shorter wavelengths, cavity apertures with diameters on the order of 1 millimeter (mm) or less are required. As a result, the power available from a stable laser cavity is limited, often to values that are orders of magnitude less than values that would be obtainable if the full aperture could be used. The bandwidth of stable cavities is usually restricted by using a conventional dispersing element, i.e., a grating, a prism or a Fabry-Perot etalon, in the cavity to spread the radiation angularly according to wavelength. Narrow-bandwidth operation is then obtained by restricting the angular acceptance of the cavity. This operation is compatible with a mode-restricting aperture used for limiting the spatial divergence that was described above, but is incompatible with high power operation.

High power laser sources are obtainable with narrow bandwidths and low divergence radiation using laser amplifiers downstream of the oscillator. Such systems are the primary source for laser radiation with all three desired characteristics, but the multiple lasers required by these systems increase both the size and cost of the system. In addition, the complexity of the optical train required to match the output of one stage into the input of the next stage increases. In some pulsed laser systems, jitter in timing between the various stages can reduce system reliability.

Unstable resonators provide an alternative approach to obtaining high power, low divergence laser radiation. In unstable resonators, the laser radiation fills a relatively large diameter cavity, allowing operation at high power levels while restricting the divergence of the generated laser radiation to a low value, usually near the diffraction limit for a suitably designed system, as is well known to arise from the properties of the transverse modes of unstable resonators. Some success has been achieved in frequency narrowing the laser radiation from unstable resonator cavities using gratings. This technique works best with lasers having sharp line structure, e.g., molecular lasers. For example, selection of a single line in HF and $CO_2$ lasers by insertion of a grating into a conventional unstable resonator cavity is known.

In lasers having broad-band continuous gain distributions, i.e., excimer and dye lasers, insertion of a grating in an unstable resonator laser cavity does not provide sufficient spectral discrimination for narrow-band operation. The conventional unstable resonator laser cavity is fundamentally incompatible with the requirements of frequency narrowing elements used in restricting the bandwidth, especially when extremely narrow linewidths are desired. The modes of an unstable resonator laser cavity require that divergence of the laser radiation inside the cavity alternate between high and low values on alternate passes through the cavity, while frequency narrowing elements work best with collimated radiation. As a result, it is not possible to use angular discrimination to restrict the bandwidth of the laser radiation as is done in stable cavities. Thus, although unstable resonator laser cavities are the configuration of choice for providing high power, low divergence laser radiation they are usually not compatible with a simultaneous requirement for narrow bandwidth.

An unstable resonator laser cavity employing a telescopic full cavity ring, in which the gain medium and the ring form a continuous loop and the magnification is achieved by a telescope within the ring, is also known. This cavity has extensive collimated regions that offer potential for frequency narrowing. However, the beam passes through the gain medium only once on each cavity round trip. As a result, this type of cavity generally requires a large number of cavity transits to reach threshold and can work only with lasers that have gain media with a combination of high gain and long lifetime.

An unstable resonator laser cavity developed by some of the inventors of the present invention is disclosed in U.S. Pat. No. 4,868,515, which discloses all three desirable characteristics of high power, low divergence and narrow bandwidth by employing an asymmetric feedback ring. The invention represents a substantial improvement in the state of the art because the feedback ring provides a section of the cavity that contains only collimated laser radiation, thus allowing optimal use of frequency narrowing devices, e.g., Fabry-Perot etalons. At the same time, the length of the feedback ring can be kept to a minimal value, and the laser radiation makes two passes through the gain medium on each cavity transit, thus overcoming the limitations of the cavity with the full telescope ring. As a result, this type of cavity works with all types of lasers, including the class of lasers in which the gain medium has a limited gain or lifetime, such as electric-discharge, rare-gas-halide excimer lasers, with which the resonator with the full cavity ring would not work.

SUMMARY OF THE INVENTION

It is one object of this invention to provide an unstable resonator laser cavity that produces laser radiation characterized by high power, diffraction-limited divergence and narrow-bandwidth.

Another object of this invention is to provide further improvement in frequency narrowing and output power efficiency over that provided by the feedback ring cavity of U.S. Pat. No. 4,868,515 through the use of a ring located in the output section of the cavity and frequency narrowing optics located in the main cavity outside the ring.

Another object of this invention is to provide a laser cavity containing polarizing optics in which only collimated light strikes polarizing optics within the cavity.

Another object of this invention is to use optical components that couple the laser radiation into the ring from the gain medium in a forward direction, and out of the ring back into the gain medium without significant loss at the coupling element.

Another object of this invention is to suppress the backward wave in the ring, preventing operation of the resonator as a stable cavity.

These and other objects and advantages are achieved in accordance with the present invention by an unstable resonator laser cavity comprised of a gain medium for generating and amplifying laser radiation, a reflecting means optically coupled to the gain medium for providing feedback to the gain medium, a passing means optically coupled to the gain medium for passing light from the gain medium polarized in a first direction and reflecting light from the gain medium that is polarized in a second direction, frequency narrowing means for reducing the bandwidth of the laser radiation located between the reflecting means and the passing means, a telescopic ring means optically coupled to the passing means defining an optical loop for directing first polarization polarized laser radiation generated by the gain medium around the loop in a forward direction and back into the gain medium via the passing means, while directing second polarization polarized laser radiation around the loop in a backward direction and away from the gain medium via the passing means, and a scraper mirror for coupling light out of the cavity.

The advantages provided by this invention are: a) only collimated light strikes the frequency narrowing means, optimizing its effectiveness; b) the optical length of the ring can be kept short, allowing use with gain media with short lifetimes; c) two passes are made through the frequency narrowing optics on each cavity round trip, increasing their effectiveness in reducing the bandwidth of the laser radiation; d) only collimated light strikes all polarizing optics, improving the radial intensity uniformity of the beam; and e) the output power can be optimized by location of the scraper mirror within the telescopic ring, allowing the light to make two passes through the gain medium at the full width of the gain medium on each cavity round trip.

BRIEF DESCRIPTION OF THE DRAWINGS

The preferred embodiments are described with reference to the drawings, in which like elements are denoted by like numbers, and in which.

DESCRIPTION OF THE PREFERRED EMBODIMENTS

Figure 1:
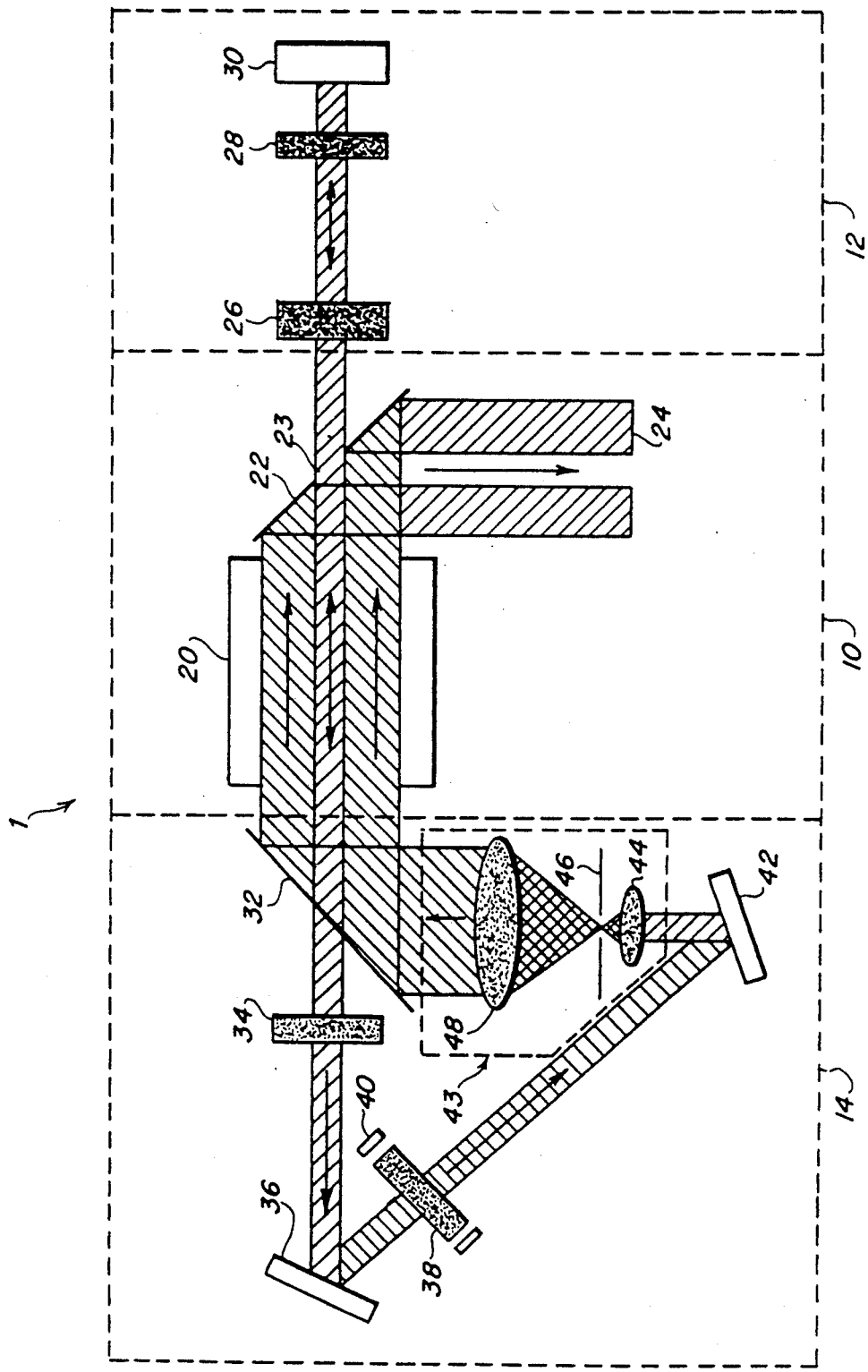
FIG. 1 is a schematic diagram of a first embodiment of an unstable resonator laser cavity using a telescopic ring in the output section according to the present invention.

Referring to FIG. 1, a first embodiment of an unstable resonator laser cavity 1 according to the present invention comprises a laser gain section 10 for generating and amplifying laser radiation optically coupled to a feedback section 12 for providing feedback and bandwidth narrowing of the laser radiation returned to laser gain section 10; and a telescopic ring 14 defining an optical loop for use in providing output laser radiation. Laser gain section 10 comprises a gain medium 20, which, for example, can be a conventional xenon-chloride laser source for generating laser radiation; and a scraper mirror 22 for receiving laser radiation from gain medium 20 and forming an output beam 24. The scraper mirror 22 has a central hole 23 for passing a predetermined section of laser radiation between gain medium 20 and feedback section 12. Feedback section 12 includes a frequency-narrowing element 26, a quarter waveplate 28 and a full reflector 30, the functions of which are described in detail below.

Telescopic ring 14, which provides a substantially unidirectional circulating path or optical loop for laser radiation, comprises a polarized beam splitter 32 receiving laser radiation from gain medium 20; and first and second reflectors 36 and 42 for directing received laser radiation through telescope 43 so as to strike beam splitter 32. The telescope 43 is comprised of lenses 44 and 48 and may contain aperture 46 for additional spatial filtering of the optical beam. Lenses 44 and 48 in telescope 43 are shown as convex lenses in FIG. 1, but it should be understood that other types of lenses can be used. Beam splitter 32 is a polarized reflector, which passes, for example, horizontally polarized laser radiation in a first direction, which is described here as the forward direction of the ring, and reflects vertically polarized laser radiation in a second direction, which is described here as the backward direction of the ring. Beam splitter 32 is disposed at an angle to the optical centerline of gain medium 20 so that polarized laser radiation travelling in the forward direction in the ring is reflected back into gain medium 20 and polarized laser radiation travelling in the backward direction is reflected out of telescopic ring 14, as discussed in detail below. Lenses 44 and 48 comprise the telescope 43 for expanding and re-collimating the forward travelling radiation at a beamwidth matching the width of gain medium 20. Also located within telescopic ring 14 are an optical rotator 34 and a Faraday rotator 38, which cooperate to rotate polarized laser radiation travelling in the forward direction received from beam splitter 32. Faraday rotator 38 can be a conventional Faraday rotator, which is described in greater detail below.

In the operation of laser 1, laser radiation generated and/or amplified by gain medium 20 is transmitted to scraper mirror 22, which is configured such that incident laser radiation is reflected out of laser 1 as output beam 24, while laser radiation aligned with hole 23, i.e., radiation in the Fresnel core of the laser cavity is transmitted to frequency narrowing element or means 26 in feedback section 12. Frequency narrowing means 26 can be comprised of one or more serially-aligned frequency narrowing elements, i.e., diffraction gratings, prisms, Fabry-Perot etalons, or a combination thereof. The frequency bandwidth of laser radiation striking frequency narrowing means 26 is reduced from the broadband provided by gain medium 20 to a narrower bandwidth.

Initially, the light produced by the gain medium 20 contains two orthogonal polarization components, which, for purposes of illustration here, will be taken as horizontal and vertical. Real polarizing elements, such as those described in this invention, do not provide perfect decomposition into horizontal and vertical components, but they do provide polarization components that are substantially horizontal and vertical for the purposes of this invention. For the present discussion, the polarization components in the various parts of the cavity will be taken to be horizontal or vertical. Other types of polarization (e.g., circular or linear polarization at 45° to the vertical) are also to be understood to be substantially, although not perfectly, in the condition described.

The vertically polarized component of the laser radiation from gain medium 20 passing through frequency narrowing means 26 strikes quarter waveplate 28, which produces laser radiation that is circularly polarized in a first sense. The circularly polarized laser radiation then strikes full reflector 30 and is reflected back toward gain medium 20. Upon reflection, the sense of circular polarization is changed from the first sense to a second sense opposite to the first sense. The circularly polarized laser radiation of the second sense then passes through quarter waveplate 28, which converts it to linearly polarized laser radiation in the horizontal direction. The horizontally polarized laser radiation passes through the frequency narrowing means 26 for further reduction in bandwidth, through hole 23 and into gain medium 20. Frequency narrowing means 26 is located so that laser radiation passes through frequency narrowing means 26 twice on each round trip of laser 1, thereby increasing the effectiveness of frequency narrowing means 26 in reducing the frequency bandwidth. It can be located anywhere outside of the telescopic ring, i.e., anywhere between reflector 30 and passing means 32. However, location of frequency narrowing means 26 in the feedback section 12 offers the advantage that the diameter of the elements in the frequency narrowing means can be smaller if it is located inside of the feedback section.

Horizontally polarized laser radiation entering gain medium 20 from hole 23 is amplified by the gain medium 20 and then passes through beam splitter 32 into the ring 14 in a first direction, which is identified here as the forward direction. The radiation travelling in the forward direction in the ring 14 passes through optical rotator 34, which rotates the horizontally polarized laser radiation by substantially 45° and then strikes reflector 36. Reflector 36 directs the laser radiation toward reflector 42 via Faraday rotator 38, which rotates the polarization of the laser radiation by substantially 45° in the same direction as the rotation produced by the optical rotator 34, producing radiation that is substantially polarized in the vertical direction. The vertically polarized radiation is reflected by reflector 42 through telescope 43 to polarizing beam splitter 32. The beamwidth of the radiation is increased by lenses 44 and 48 of telescope 43, which comprise an expanding, collimating telescope, so that its beamwidth matches the width of gain medium 20. The vertically polarized radiation is reflected from beam splitter 32 toward gain medium 20 and starts another round trip in the cavity of laser 1.

Figure 2:
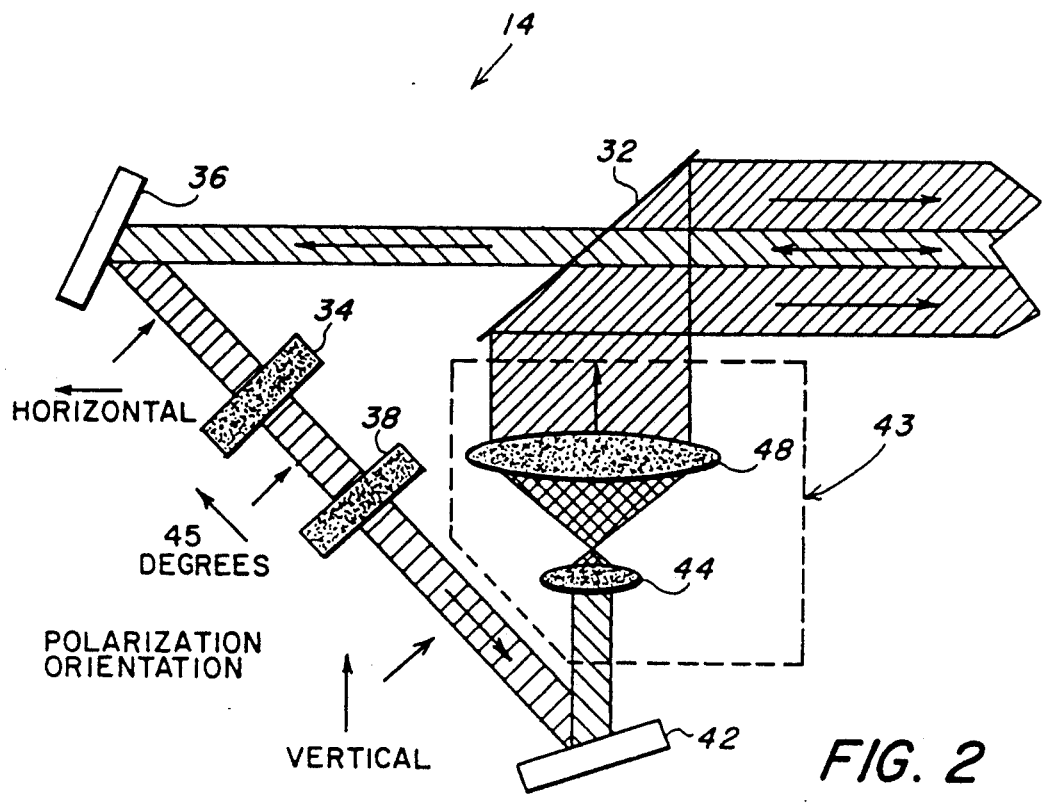
FIGS. 2 and 3 are schematic diagrams of the telescopic ring portion of the unstable resonator laser cavity of FIG. 1, illustrating in FIG. 2 passage of the first polarization polarized laser radiation around the ring in a forward direction and back toward the gain medium, and, in FIG. 3, passage of the second polarization polarized laser radiation around the ring in a backward direction and subsequent reflection away from the gain medium.
Figure 3:
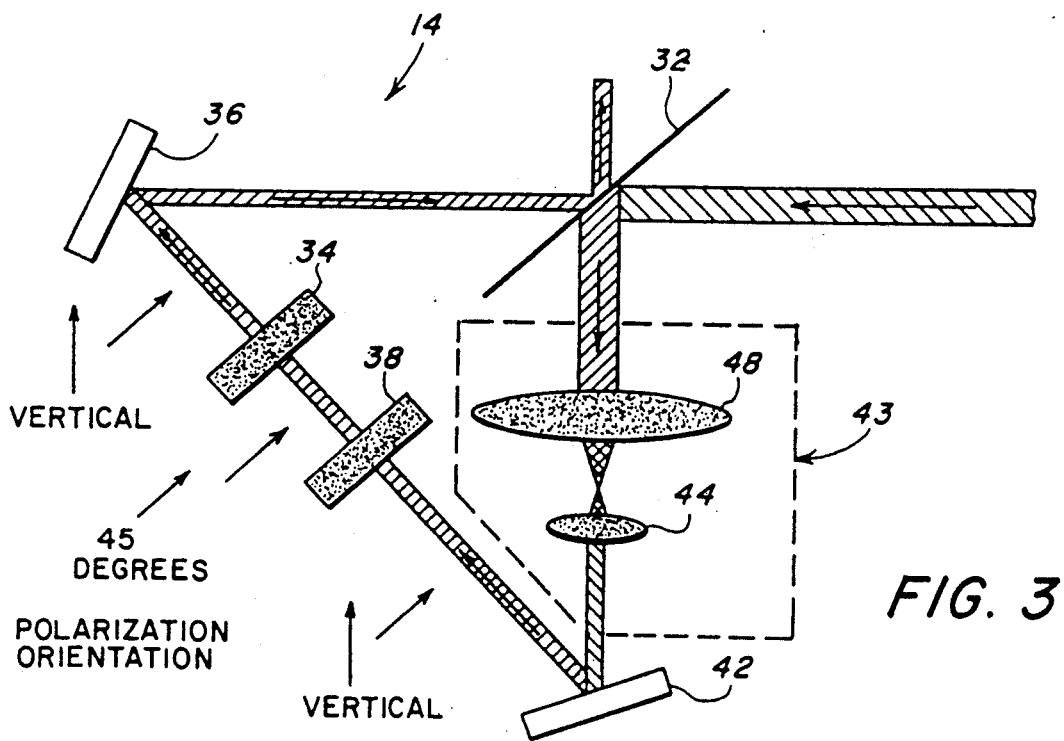

Referring to FIGS. 2 and 3, the operation of optical rotator 34 and Faraday rotator 38 will now be described. For clarity, optical rotator 34 and Faraday rotator 38 are shown in FIGS. 2 and 3 located between reflectors 36 and 42. It will be appreciated that optical rotator 34 and Faraday rotator 38 are positionable anywhere within telescopic ring 14 except within telescope 43. However, it is preferable that laser radiation travelling in the forward direction traverses rotators 34 and 38 prior to traversing lenses 44 and 48, because this arrangement allows use of smaller diameter optical components.

Faraday rotator 38 rotates the polarization of laser radiation travelling in the forward direction by approximately 45° in a first direction, e.g., a first sense, while rotating the polarization of laser radiation travelling in the backward direction approximately 45° in a second direction, e.g., a second sense, that is opposite to the first direction. It should be appreciated that the first direction of rotation can be either clockwise (CW) or counterclockwise (CCW), with the second direction being opposite to the first direction, and with the sense of rotation being measured with respect to the direction of propagation of the light beam. For purpose of this discussion, the first direction will be clockwise.

Faraday rotator 38 can be a magnetooptic material that operates in a magnetostatic field produced by a magnetic source 40 surrounding Faraday rotator 38. Magnetic source 40 can be comprised of one or more ceramic magnets which provide a high magnetic flux from a source with a relatively small size and weight.

Referring specifically to FIG. 2, horizontally polarized laser radiation exiting gain medium 20 strikes beam splitter 32 and is transmitted without a change of polarization into the ring 14 in the forward direction, i.e., toward reflector 36, which then redirects horizontally polarized laser radiation toward optical rotator 34. Optical rotator 34 transmits polarized laser radiation in the forward direction while rotating the polarization orientation by substantially 45° in the clockwise direction. Faraday rotator 38 receives the polarized laser radiation and transmits it in the forward direction toward reflector 42 while rotating the polarized laser radiation by substantially 45° in the CW direction. Thus, the combined effect of optical rotator 34 and Faraday rotator 38 is to rotate the direction of polarization of light travelling in the forward direction from substantially horizontal to substantially vertical. The now substantially vertically polarized laser radiation travelling in the forward direction is expanded and recollimated by telescope 43 and strikes beam splitter 32. Since the laser radiation is vertically polarized, beam splitter 32 reflects the laser radiation back into gain medium 20.

Referring specifically to FIG. 3, laser radiation leaving gain medium 20 that is vertically polarized is reflected by beam splitter 32 into ring 14 in the backward direction to reflector 42 via telescope 43, which reduces the width of the beam travelling in the backward direction. Reflector 42 directs the light to reflector 36 via Faraday rotator 38 and optical rotator 34. Faraday rotator 38 rotates the direction of polarization of the laser radiation travelling in the backward direction by substantially 45° in the CCW direction. The optical rotator 34 receives the light transmitted by the Faraday rotator 38 and rotates the direction of its polarization by substantially 45° in the CW direction, substantially canceling the rotation caused by the Faraday rotator 38. Therefore, the combined action of the Faraday rotator 38 and the optical rotator 34 is to produce no change of direction of polarization for light travelling through the ring 14 in the backward direction. After leaving the optical rotator 34, the substantially vertically polarized light strikes reflector 36 and is directed to beam splitter 32, from which it is reflected out of laser 1.

It should be noted that the Faraday rotator 38 in the present invention allows operation of laser 1 as an unstable resonator by providing a means for coupling out laser radiation travelling in the backward direction in the telescopic ring 14, e.g., suppressing the backward wave in ring 14. Failure to suppress this backward wave would result in operation of laser 1 as a stable cavity with a small diameter and would not achieve the goals of the present invention. Although suppression is accomplished here with a Faraday rotator, any other technique that similarly achieves suppression of the backward wave would accomplish the goals of the present invention and would therefore not depart from the scope of this invention.

It should also be noted that the polarizing optics in the cavity minimize the losses encountered in coupling radiation into and out of the ring 14 and also aid in suppressing the backward wave in the ring 14. Thus, while the specific configuration described here utilizes such polarizing optics, other techniques that minimize coupling losses without polarizing optics and allow suppression of the backward wave in the ring 14 are also compatible with the present invention.

Figure 4:
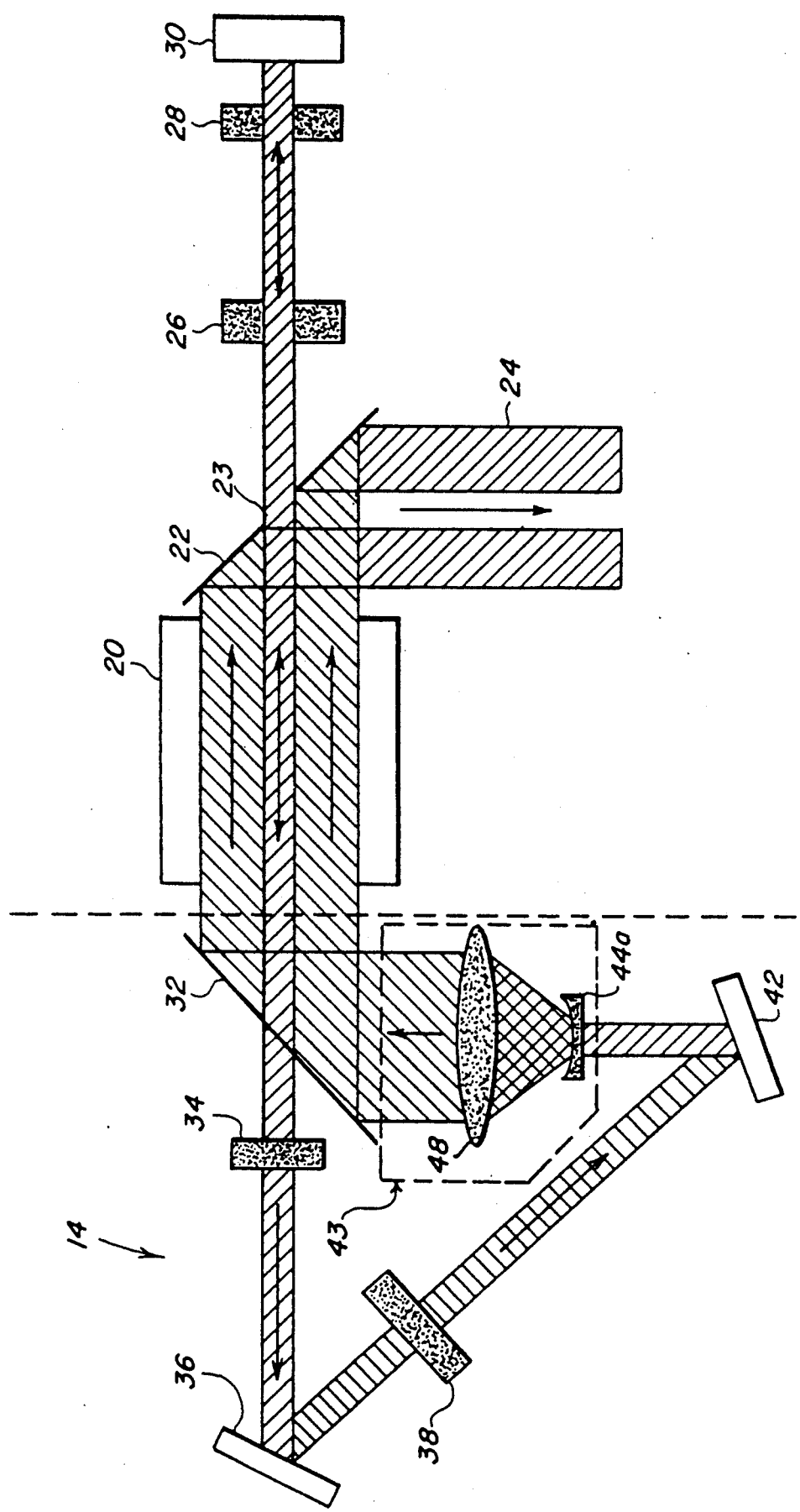
FIG. 4 is a schematic diagram of a modification of the embodiment of FIG. 1 in which the shorter focal length lens in the telescope in the ring is changed from a positive focal length to a negative focal length, shortening the length of the ring.

FIG. 4 is a modification of the embodiment of FIG. 1 in which convex lens 44 is replaced by concave lens 44a. Lenses 44a and 48 are spatially separated by the algebraic sum of their focal lengths (the focal length of lens 44a is negative). This substitution shortens the length of the telescope ring 14, improving performance of the laser 1 with gain media that have a very short gain duration. It also eliminates the focus between lenses 44 and 48 of the embodiment of FIG. 1, eliminating the possibility of air breakdown in the focus in lasers with very high powers.

Figure 5:
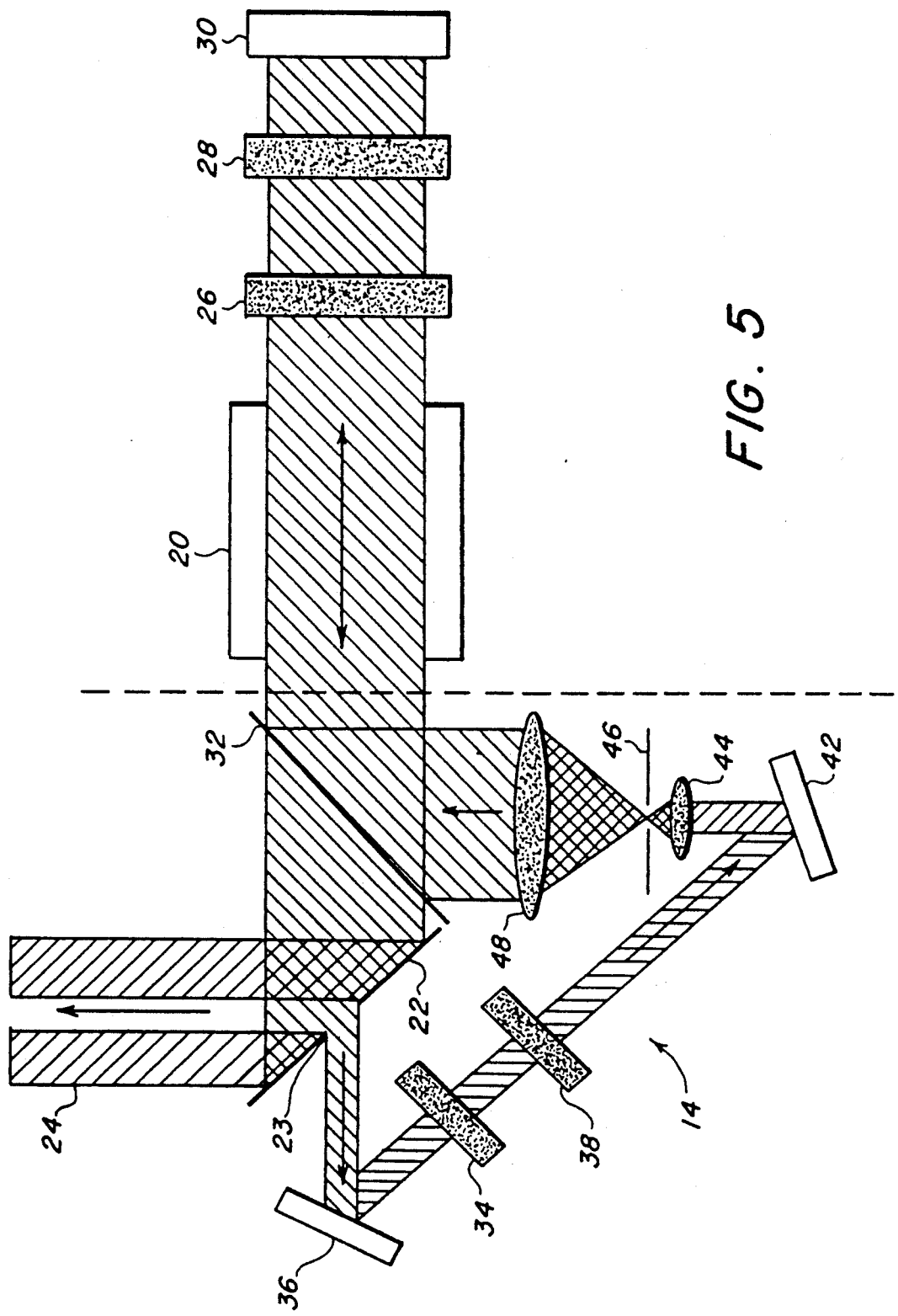
FIG. 5 is a schematic diagram of a modification of the embodiment of FIG. 1 in which the scraper mirror is located inside the ring.

FIG. 5 is another modification of the embodiment of FIG. 1 in which scraper mirror 22 is located within telescopic ring 14 and is optically coupled between beam splitter 32 and reflector 36. In this modification, the laser radiation makes two passes through the gain medium 20 with a beam width equal to the full width of the gain medium 20 on each cavity round trip. This provides a higher total power entering the gain medium 20 on the final pass before being coupled out of the cavity by scraper mirror 22, thereby increasing the output power of the laser 1. It should be noted that the higher output power produced by the modified embodiment of FIG. 5, with respect to the power output of the embodiment of FIG. 1, is achieved by employing larger, more expensive optical elements in feedback section 12.

What has been shown is a laser cavity configuration that produces narrow bandwidth, high-power, low-divergence radiation in which the performance over previous art is improved because a) only collimated light strikes the frequency narrowing means, optimizing its effectiveness; b) the optical length of the ring can be kept short, allowing use with gain media with short lifetimes; c) two passes are made through the frequency narrowing optics on each cavity round trip, increasing their effectiveness in reducing the bandwidth of the laser radiation; d) only collimated light strikes all polarizing optics, improving the radial intensity uniformity of the beam; and e) the output power can be optimized by location of the scraper mirror within the telescopic ring, allowing the light to make two passes through the gain medium at the full width of the gain medium on each cavity round trip.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. An unstable resonator laser cavity providing high power radiation with diffraction-limited divergence and narrow-bandwidth, comprising:
    a gain medium for generating and amplifying polarized laser radiation which produces polarized laser radiation having first and second polarizations;
    a reflector optically coupled to said gain medium for reflecting laser radiation received from said gain medium back to said gain medium;
    means defining an optical loop optically coupled to said gain medium for directing first polarization polarized laser radiation generated by said gain medium around said optical loop and back into said gain medium and directing second polarization polarized laser radiation from said gain medium, around said optical loop and away from said gain medium, said directing means including means for passing laser radiation of said first polarization in a first direction and reflecting laser radiation of said second polarization in a second direction different from said first direction; and
    frequency narrowing means disposed between said passing means and said reflector for bandwidth-narrowing said laser radiation travelling between said passing means and said reflector to thereby produce improved frequency narrowing.

2. The unstable resonator laser cavity of claim 1, further including a quarter wave plate interposed between said reflector and said frequency narrowing means.

3. The unstable resonator laser cavity of claim 1, wherein said frequency narrowing means is selected from a group consisting of a diffraction grating, a prism and a Fabry-Perot etalon, or a combination thereof.

4. The unstable resonator laser cavity of claim 1, wherein said directing means includes:
    a polarized beam splitter optically coupled to said gain medium for passing said first polarization of laser radiation into said optical loop in a first direction and reflecting said second polarization of laser radiation into said optical loop in a second direction;
    rotator means for rotating said first polarization of laser radiation to produce said second polarization of laser radiation travelling in said first direction; and
    lens means for controlling the beamwidth of said first and second polarizations of laser radiation within said optical loop, said lens means being located within the loop such that said second polarization of laser radiation reflected by said polarized beam splitter and travelling in said second direction traverses said lens means prior to traversing said rotator means.

5. The unstable resonator laser cavity of claim 4, wherein said lens means forms an expanding, collimating telescope for laser radiation travelling in said optical loop in said first direction.

6. The unstable resonator laser cavity of claim 4, wherein said rotator means includes first and second rotators serially coupled to each other for rotating said first polarization of laser radiation travelling in said first direction by a total rotation of approximately 90°.

7. The unstable resonator laser cavity of claim 1, wherein said directing means includes:
a polarized beam splitter optically coupled to said gain medium for passing said first polarization of laser radiation into said optical loop in a first direction and reflecting said second polarization of laser radiation into said optical loop in a second direction;
rotator means located within said optical loop and optically coupled to said polarized beam splitter for rotating said first polarization of laser radiation by approximately 90° to produce said second polarization of laser radiation travelling in said first direction;
lens means located within said optical loop and optically coupled to said rotator means for controlling the beamwidth of said second polarization of laser radiation travelling in said first direction; and
reflector means located within said optical loop for reflecting said second polarization of laser radiation onto said polarized beam splitter such that said second polarization of laser radiation travelling in said first direction is reflected by said polarized bean splitter back into said gain medium and said second polarization of laser radiation travelling in said second direction is reflected out of said optical loop and away from said gain medium.

8. The unstable resonator laser cavity of claim 7, further including a scraper mirror optically coupled between said polarized beam splitter and said lens means for use in providing an output beam.

9. The unstable resonator laser cavity of claim 1, further including a scraper mirror optically coupled to said gain medium and located between said gain medium and said reflector for use in providing an output beam.

10. The unstable resonator laser cavity of claim 1 wherein:
said frequency narrowing means is disposed between said gain medium and said reflector.

11. The unstable resonator laser cavity of claim 10, wherein said frequency narrowing means is selected from a group consisting of a diffraction grating, a prism, a Fabry-Perot etalon, or a combination thereof.

12. The unstable resonator laser cavity of claim 10, further including:
a quarter wave plate interposed between said frequency narrowing means and said reflector.

13. An unstable resonator laser cavity comprising:
a gain medium for generating and amplifying laser radiation;
a reflector optically coupled to said gain medium for providing feedback to said gain medium;
a scraper mirror having a hole aligned with the centerline of said gain medium, wherein said scraper mirror reflects a first portion of laser radiation generated by said gain medium to produce an output beam, and a second portion of laser radiation from said gain medium is transmitted through said hole to said reflector; and
a telescopic ring defining an optical loop, said telescopic ring including:
a polarized beam splitter optically coupled to said gain medium for passing polarized laser radiation having a first polarity into said optical loop in a first direction and reflecting polarized laser radiation having a second polarity into said optical loop in a second direction different from said first direction, wherein said first and second polarities are different by approximately 90°;
rotator means for rotating first polarity polarized laser radiation travelling in said first direction from said polarized beam splitter by approximately 90° to produce second polarity polarized laser radiation travelling in said first direction;
lens means optically coupled to said rotator means for directing said second polarity polarized laser radiation travelling in said first direction onto a side of said polarized beam splitter opposing said gain medium such that said second polarity polarized laser radiation travelling in said first direction is reflected back into said gain medium; and
frequency narrowing means disposed between said polarized beam splitter and said reflector for narrowing the frequency bandwidth of said laser radiation travelling between said polarized beam splitter and said reflector to thereby produce improved frequency narrowing.

14. The unstable resonator laser cavity of claim 13, wherein said telescopic ring further comprises reflector means located within said optical loop such that polarized laser radiation travelling in said first direction from said polarized beam splitter traverses said reflector means prior to traversing said lens means.

15. The unstable resonator laser cavity of claim 13, wherein said rotator means further comprises:
a first rotator for rotating said first and second polarity polarized laser radiation by 45° in a first sense; and
a second rotator for rotating said polarized laser radiation travelling in said first direction by 45° in said first sense and for rotating said polarized laser radiation travelling in said second direction by 45° in a second sense, said second rotator cooperating with said first rotator to rotate polarized laser radiation travelling in said first direction by a total of 90° in said first sense and to rotate said polarized laser radiation travelling in said second direction by 0°.

16. The unstable resonator laser cavity of claim 13, wherein said rotator means further comprises first and second rotators serially aligned with each other and cooperating to rotate said first polarity polarized laser radiation travelling in said first direction to produce said second polarity polarized laser radiation travelling in said first direction and to transmit said second polarity polarized laser radiation travelling in said second direction without rotation.

17. The unstable resonator laser cavity of claim 13 wherein said frequency narrowing means is located between said gain medium and said reflector.

18. The unstable resonator laser cavity of claim 12 further including:
a quarter wave plate interposed between said frequency narrowing means and said reflector.

19. The unstable resonator laser cavity of claim 13 wherein:
said frequency narrowing means is selected from a group consisting of a diffraction grating, a prism and a Fabry-Perot etalon, or a combination thereof.

* * * * *